Aug. 21, 1951     F. PORTER ET AL     2,565,087
PROCESS FOR OXIDATION OF CYCLOALIPHATIC COMPOUNDS
Filed Oct. 30, 1947
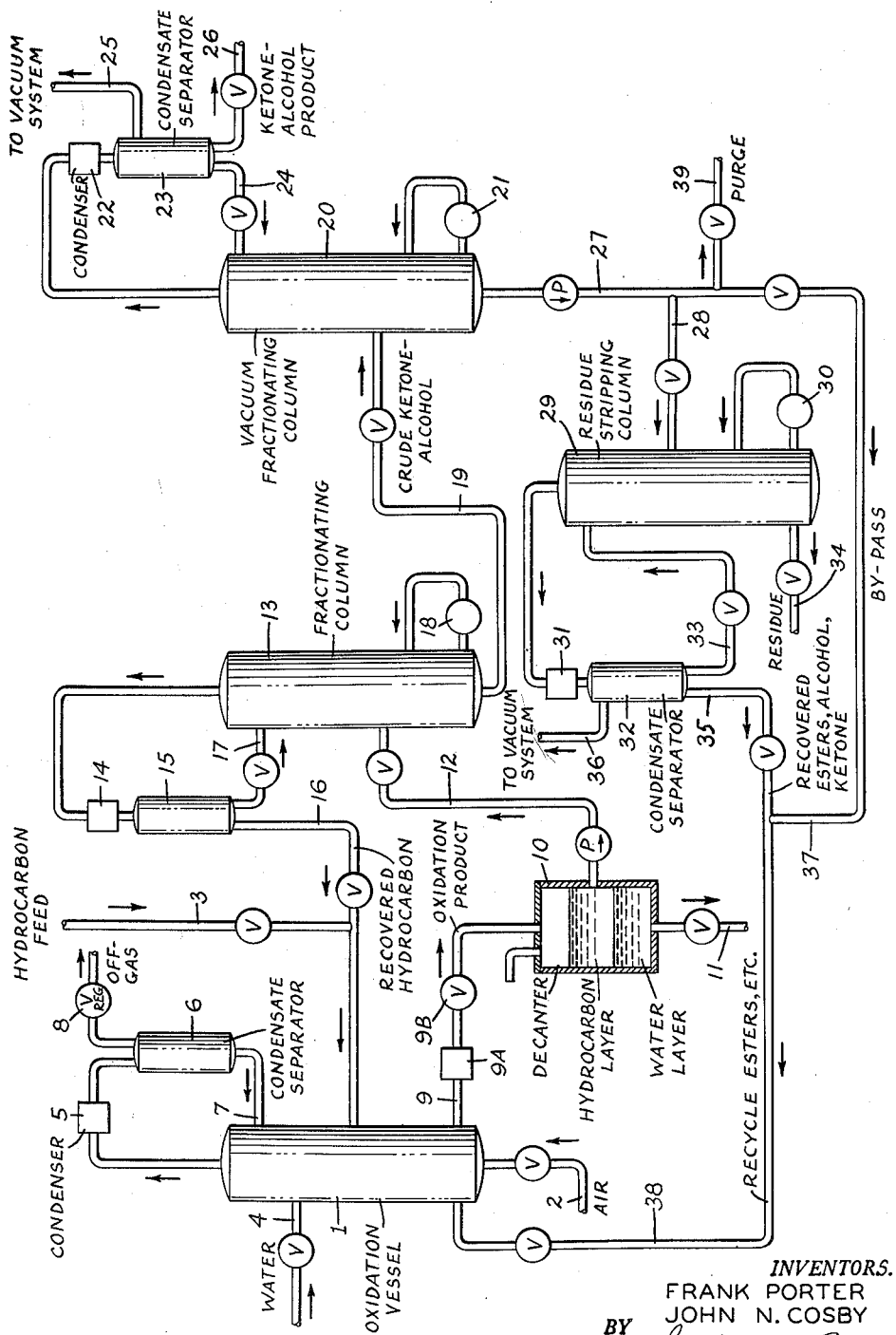
INVENTORS.
FRANK PORTER
JOHN N. COSBY
BY
Charles W Brown
ATTORNEY.

Patented Aug. 21, 1951

2,565,087

UNITED STATES PATENT OFFICE 2,565,087

PROCESS FOR OXIDATION OF CYCLO-ALIPHATIC COMPOUNDS

Frank Porter, Morristown, and John N. Cosby, Morris Township, Morris County, N. J., assignors to Allied Chemical & Dye Corporation, New York, N. Y., a corporation of New York Application October 30, 1947, Serial No. 783,132

8 Claims. (Cl. 260—631)

This invention relates to the oxidation of cycloaliphatic hydrocarbons in the liquid phase with a gas containing molecular oxygen.

It is known that oxidation products such as cyclohexanol and cyclohexanone, or methyl cyclohexanol and methyl cyclohexanone, may be produced by oxidizing the cycloaliphatic hydrocarbon cyclohexane or methyl cyclohexane, respectively, with air or other gas containing molecular oxygen at elevated temperatures and pressures at least sufficiently high to maintain the reactant in the liquid phase. Reactions have been carried out in the presence or absence of catalysts such as cobalt naphthenate and the treatment with the oxygen-containing gas continued until attacks of reactant ranging as high as 50–60% have been attained. The off-gas from the oxidation, comprising inert gas (nitrogen in case air is used), oxides of carbon, unreacted cyclohexane or methyl cyclohexane and water, is ordinarily cooled to condense the cyclohexane or methyl cyclohexane and water, which are then returned directly to the reaction mixture. The liquid product of the oxidation is distilled at atmospheric pressure, unreacted hydrocarbon is removed, and a crude ketone-alcohol product is obtained as the residue. The crude ketone-alcohol is then distilled under vacuum to separate the cyclic alcohol and ketone from higher boiling material.

It is known that side reactions take place to an appreciable extent during the oxidation process, causing low yields of the indicated desired products, and the necessity of troublesome and expensive processes for separating these by-products and purifying the desired products in subsequent operations. For the purpose of reducing the quantity of by-products formed, it has been proposed to carry out the oxidation in the presence of added agents, but such operation has frequently been ineffective for the result sought, or has caused low yields of desired products. Esters of cyclohexanol or methyl cyclohexanol comprise a substantial portion of such by-products. Following the vacuum distillation described above the cyclic ketone-alcohol distillate is refractionated to recover a more concentrated ketone-alcohol product or the alcohol and the ketone as separate products, with a lower proportion of contaminants particularly the esters of the cyclic alcohol. The lower aliphatic esters such as cyclohexyl formate and acetate comprise a large proportion of the total esters present, and these compounds boil at temperatures close to the corresponding cyclic aliphatic alcohol and ketone. Hence, the fractionation procedures used for purification of the desired products are difficult and expensive.

Recovery of cyclic alcohol from the esters is important economically even in processes in which the desired end product is the cyclic ketone, since in such processes the alcohol may be converted to ketone by well known procedures. In the past it has been proposed to saponify these cycloaliphatic esters following their separation from the alcohol and ketone, and recover the alcohol from the saponified esters by distillation. The necessity for saponification is a disadvantage because additional equipment and operating procedures are required and the caustic required for the decomposition of the esters adds expense to the operation.

One object of our invention is to carry out the liquid phase oxidation of cyclohexane or methyl cyclohexane with air or other gas containing oxygen in such a way that the amount of esters formed is substantially reduced and the amount of cycloaliphatic alcohol plus ketone produced is increased as compared with results obtained according to methods of the prior art.

A second object of our invention is to carry out the liquid phase oxidation of cyclohexane or methyl cyclohexane with air or other gas containing oxygen in such a way that a crude ketone-alcohol product having a substantially lower concentration of esters and higher concentration of ketone plus alcohol is produced than that produced by prior art processes.

Other objects of our invention will appear hereinafter.

We have discovered that in the liquid phase oxidation of the cycloaliphatic hydrocarbon cyclohexane or methyl cyclohexane with a gas containing oxygen such as air, the objects of our invention stated above may be obtained if the oxidation is terminated at attacks of 15% or less, a substantial portion of the oxidation is carried out in the presence of at least 10% added water (water in addition to that formed by the oxidation process itself) based on the cyclohexane or methyl cyclohexane charged, and the water phase of the crude oxidation product is separated from the oil phase containing hydrocarbon, alcohol and ketone, before the latter is distilled to remove unoxidized hydrocarbon and obtain a crude ketone-alcohol product.

Any additional quantity of added water over the 10% mentioned above may be used, the maximum being limited by practical considerations of reactor volume, etc. which are understood by those skilled in the art. The advantages of larger amounts of water are lower concentration of esters in the crude oxidation product and in the crude ketone-alcohol, greater ease of separation of esters from the alcohol and ketone due to the lower concentration, and improvement in the procedure for recovery of cyclic alcohol from the esters.

Substantial reductions in the production of ester by-product are realized if a substantial fraction of the total oxidation of the cycloaliphatic hydrocarbon is carried out in the presence of added water in the amounts indicated. The length of time during which the added water must be present will depend upon the intensity of agitation, temperature, and other factors familiar to those skilled in the art. In general, the water should be added at such a time during the course of the oxidation reaction that at least 50% of the hydrocarbon which is oxidized is oxidized in the presence of such added water. We prefer to add the water to the reactant before the start of the oxidation reaction, since this procedure generally is simpler than adding the water after the oxidation has begun. Before distilling the crude oxidation product to recover unreacted hydrocarbon, the water is removed by layer separation and decantation, or other techniques well known to the art for separating non-homogeneous mixtures of liquids having different densities, such as centrifugal separation.

The substantially lower content of esters of cycloaliphatic alcohol and the higher content of alcohol plus ketone in the crude ketone-alcohol as described above as compared with processes of the prior art, are distinct advantages of our invention. Further, after subsequent purification procedures, a purer ketone-alcohol product is obtained in greater yield while effecting simplifications and improvements in the methods of recovering esters.

The advantages of our invention result from oxidizing cyclohexane or methyl cyclohexane in the liquid phase with air or other gas containing oxygen in the presence of at least 10% added water based on the cycloaliphatic hydrocarbon charged, and terminating the oxidation at an attack of the hydrocarbon of 15% or less. The crude oxidation product so obtained has lower ester content, and greater content of cycloaliphatic alcohol plus ketone, than in processes of the prior art. Accordingly, this is one embodiment of our invention.

The accompanying drawing illustrates a complete process for the production and recovery of cycloaliphatic ketone and alcohol embodying our invention. With reference to the drawing, cycloaliphatic hydrocarbon is introduced into a stainless steel oxidation vessel I through pipe 3 and water is added through pipe 4 to provide a ratio of water to hydrocarbon fed within the range specified above. Air under appropriate pressure is passed through pipe 2 into oxidation vessel I and is intimately contacted with the cycloaliphatic hydrocarbon heated at an appropriate temperature by heating means not shown in the drawing. The air is injected into the hydrocarbon in such manner as to strongly agitate it and maintain the water dispersed throughout the hydrocarbon. The off-gas from the oxidation vessel I passes through condenser 5 where hydrocarbon and other condensible vapors are removed. The condensate collects in separator 6 from which it is returned directly to the oxidation vessel through pipe 7, while the more difficulty condensible gases pass off through regulating valve 8.

When the desired degree of oxidation has been attained, limited as set forth above to an attack not greater than 15%, the crude oxidation product is withdrawn from reaction vessel I through pipe 9, cooled in cooler 9A and discharged through a control valve 9B into decanter 10. A water layer containing aliphatic and dicarboxylic acids and other by-products is removed through pipe 11 and the hydrocarbon layer containing unreacted cycloaliphatic hydrocarbon, cycloaliphatic ketone and alcohol, esters and other by-products is pumped through pipe 12 to fractionating column 13 where unreacted hydrocarbon is distilled overhead. The hydrocarbon vapors are condensed in condenser 14 and thence flow to reflux drum 15. Part is returned to column 13 as reflux through pipe 17 and the balance is returned to the oxidation vessel I through pipe 16. Reboiler 18 furnishes heat for this distillation. The crude ketone-alcohol, containing principally cycloaliphatic ketone and alcohol, esters and other by-products, is removed as bottoms from column 13.

The process described may be operated either batchwise or as a continuous process. In the latter case the hydrocarbon feed and water are continuously introduced into vessel I in the appropriate proportions at a rate which maintains a constant volume of liquid in the vessel and treated with the air continuously introduced from pipe 2. Oxidation product is withdrawn through pipe 9 at a rate which provides a residence period of the hydrocarbon in vessel I long enough for the desired attack on the hydrocarbon.

As illustrative of specific conditions for carrying out the oxidation of cyclohexane in the manner described, the cyclohexane and 12.6% by weight of water (based on the cyclohexane) are charged to oxidation vessel I. Air is passed at an appropriate rate in contact with the liquid charge in the vessel for 2 hours, while maintaining the temperature in the reactor between 165° and 170° C. and the pressure about 500 p. s. i. All of the water and cyclohexane condensed from the off-gas flows directly back to the reactor. The air flow is then stopped, and the crude oxidation product cooled and removed from the reactor. It is allowed to layer separate in the decanter and the lower water layer is decanted off. The top, oil layer is distilled to remove unreacted cyclohexane. In operating in this manner an attack on the cyclohexane charged of 13.2% is obtained. In the residue of the distillation to remove unreacted cyclohexane only 19.8% of the total cyclohexano. present is combined as ester.

The crude ketone-alcohol product produced in the manner described above is passed from column 13 through pipe 19 to a vacuum fractionating column 20. Reboiler 21, condenser 22, reflux drum 23 and reflux return line 24 are operated in the usual manner. Vacuum is drawn through line 25 and a ketone-alcohol product is drawn off through line 26. By a suitable choice of operating conditions for column 13 familiar to those skilled in the art, a ketone-alcohol product may be obtained which is substantially free of esters of said alcohol, and a corresponding residue obtained which contains substantially all of the esters present in said crude ketone-alcohol.

The residue of the distillation in column 13 contains high boiling by-products, esters of the cycloaliphatic alcohol, and may also contain some ketone and alcohol. It is drawn from the bottom of column 20 through pipe 27. All or part may be fed through pipe 28 into residue stripping column 29 where esters, alcohol and ketone are vaporized and separated from higher boiling materials by distillation under a pressure below atmospheric. The esters, alcohol and ketone are returned through pipes 35 and 38 to oxidation vessel 1 and the high boilers are withdrawn in the residue from the bottom of column 29 through pipe 34 and discarded. Reboiler 30, condenser 31, reflux drum 32 and reflux pipe 33 serve their usual functions. Vacuum is drawn through pipe 36.

In case a part only of the residue from column 20 is distilled to separate high boiling materials from esters, alcohol and ketone as described above, the amount so distilled and the corresponding amount of high boiling residue discarded are sufficient to prevent undue accumulation of high boilers in the oxidation vessel 1 and other parts of the cyclic system. The remainder of the residue may be returned to vessel 1 through by-pass 37.

If the oxidation reaction is carried out in the presence of relatively large amounts of added water, as described above, the distillation of column 20 residue in column 29 may be omitted. In this case part of the residue is removed through pipe 39 to purge high boilers from the recycled material.

If the amount of added water is approximately 30% or greater, the amount of esters remaining in the residue from the vacuum distillation of the crude ketone-alcohol (column 20) is so low that it is economically unnecessary to recover them and the entire column 20 residue may be discarded. Thus, one embodiment of our invention comprises adding 30% or more water (based on cycloaliphatic hydrocarbon charged) to the mixture undergoing oxidation, recovering the unattacked hydrocarbon, recovering the ketone-alcohol product by vacuum distillation and discarding the residue from this vacuum distillation.

A particular advantage of the embodiment of our invention which includes recovery of a purified ketone-alcohol product by fractional distillation of the crude recovered from column 13, is that the distillation of these desired products is not complicated by the presence of large quantities of esters of the cyclic alcohol as in prior art processes. The yield of cyclic alcohol plus ketone is greater. Further, the procedure for recovering cyclic alcohol from the esters is improved even in a case where the esters are saponified to recover the alcohol, since the quantity of caustic consumed is less due to the smaller quantity of esters to be treated.

The cyclic process embodying our invention described above provides a particularly effective method for recovering alcohol from the esters present in the oxidation product, without having to employ a separate added saponification step. The esters recovered in the residue from the fractionation in which a purified ketone-alcohol product is obtained, when recycled to the oxidation step, are hydrolyzed by the water which is maintained present during the oxidation process. The cyclic alcohol thus produced is recovered together with recycled ketone-alcohol and the ketone-alcohol formed by oxidation by treating the crude oxidation product in the manner described above.

We claim:

1. In the process of oxidizing in the liquid phase a cycloaliphatic hydrocarbon of the group consisting of cyclohexane and methyl cyclohexane to a product comprising an aliphatic alcohol of the group consisting of cyclohexanol and methyl cyclohexanol, by contacting a gas containing oxygen with said hydrocarbon, the improvement which comprises oxidizing said hydrocarbon by contacting said gas containing oxygen with the liquid hydrocarbon in the presence of added water in an amount within the range of 10% to (and including) about 30% by weight of said hydrocarbon, and stopping said oxidation at an attack not greater than 15%, said water being present in an amount which forms with the unoxidized hydrocarbon a reaction product containing two liquid phases, a water phase and an oil phase, and while at least 50% of said oxidation of the hydrocarbon takes place, whereby a product having a substantially reduced ester by-product content is obtained.

2. The process of claim 1 wherein the hydrocarbon subjected to the liquid phase oxidation is cyclohexane.

3. In the process of oxidizing in the liquid phase a cycloaliphatic hydrocarbon of the group consisting of cyclohexane and methyl cyclohexane to a product comprising an aliphatic alcohol of the group consisting of cyclohexanol and methyl cyclohexanol by contacting a gas containing oxygen with said hydrocarbon, the improvement which comprises adding liquid water to said liquid hydrocarbon and oxidizing the hydrocarbon by contacting said gas containing oxygen with the liquid hydrocarbon containing the added water dispersed therein in amount within the range of 10% to (and including) about 30% by weight of said hydrocarbon, and stopping said oxidation at an attack not greater than 15%, whereby a product containing two liquid phases, a water phase and an oil phase, and having a substantially reduced ester by-product content is obtained.

4. The process of claim 3 wherein the hydrocarbon subjected to the liquid phase oxidation is cyclohexane.

5. In the process of oxidizing in the liquid phase a cycloaliphatic hydrocarbon of the group consisting of cyclohexane and methyl cyclohexane to a product comprising an aliphatic alcohol of the group consisting of cyclohexanol and methyl cyclohexanol by contacting a gas containing oxygen with said hydrocarbon and distilling the resulting reaction product to remove therefrom cycloaliphatic hydrocarbon and recover a residue comprising said alcohol, the improvement which comprises oxidizing said hydrocarbon by contacting said gas containing oxygen with the liquid hydrocarbon in the presence of added water in an amount within the range of 10% to (and including) about 30% by weight of said hydrocarbon, and stopping said oxidation at an attack not greater than 15%, said water being present in an amount which forms with the unoxidized hydrocarbon a reaction product containing two liquid phases, a water phase and an oil phase, and while at least 50% of said oxidation of the hydrocarbon takes place, whereby said two-phase liquid oxidation product having a substantially reduced ester by-product content is obtained, layer-separating the two phases of said oxidation product and removing the water phase from the oil phase containing said alcohol and thereafter distilling said oil phase to remove hydrocarbon therefrom and to recover a residue containing said alcohol.

6. In the process of oxidizing in the liquid phase a cycloaliphatic hydrocarbon of the group consisting of cyclohexane and methyl cyclohexane to a product comprising an aliphatic alcohol of the group consisting of cyclohexanol and methyl cyclohexanol and esters of said alcohol, by contacting a gas containing oxygen with said hydrocarbon, distilling the resulting reaction product to remove therefrom cycloaliphatic hydrocarbon and recover a residue comprising said alcohol and esters thereof, and then distilling off from said residue a distillate comprising said alcohol, the improvement which comprises oxidizing said hydrocarbon by contacting said gas containing oxygen with the liquid hydrocarbon containing added water dispersed therein in amount within the range of 10% to (and including) about 30% by weight of said hydrocarbon, stopping said oxidation at an attack not greater than 15%, whereby a two-phase liquid oxidation product containing a water phase and an oil phase, and having a substantially reduced ester by-product content is obtained, layer-separating the two phases of said oxidation product, removing the water phase from the oil phase containing said alcohol, thereafter distilling said oil phase to remove hydrocarbon therefrom and to recover a residue containing said alcohol, distilling from said residue a distillate comprising said alcohol leaving a second residue containing esters of the alcohol, distilling from said second residue esters contained therein, and introducing said esters into a mixture of said cycloaliphatic hydrocarbon and water which is then subjected to the aforedescribed treatment with a gas containing oxygen to oxidize said hydrocarbon.

7. In the process of oxidizing in the liquid phase cyclohexane to a product comprising cyclohexanol and esters thereof, by contacting a gas containing oxygen with said cyclohexane, distilling the resulting reaction product to remove therefrom cyclohexane and recover a residue comprising said cyclohexanol and esters thereof, and then distilling off from said residue a distillate comprising said cyclohexanol, the improvement which comprises oxidizing said cyclohexane by contacting said gas containing oxygen with the liquid cyclohexane containing added water dispersed therein in amount within the range of 10% to (and including) about 30% by weight of said cyclohexane, stopping said oxidation at an attack not greater than 15%, whereby a two-phase liquid oxidation product containing a water phase and an oil phase, and having a substantially reduced ester by-product content is obtained, layer-separating the two phases of said oxidation product, removing the water phase from the oil phase containing said cyclohexanol, thereafter distilling said oil phase to remove cyclohexane therefrom and to recover a residue containing said cyclohexanol, distilling from said residue a distillate comprising said cyclohexanol leaving a second residue containing esters of cyclohexanol, distilling from said second residue esters contained therein, and introducing said esters into a mixture of said cyclohexane and water which is then subjected to the aforedescribed treatment with a gas containing oxygen to oxidize said cyclohexane.

8. In the process of oxidizing in the liquid phase cyclohexane to a product comprising cyclohexanol and esters thereof, by contacting a gas containing oxygen with said cyclohexane, distilling the resulting reaction product to remove therefrom cyclohexane and recover a residue comprising said cyclohexanol and esters thereof, and then distilling off from said residue a distillate comprising said cyclohexanol, the improvement which comprises oxidizing said cyclohexane by contacting said gas containing oxygen with the liquid cyclohexane containing added water dispersed therein in amount within the range of 10% to (and including) about 30% by weight of said cyclohexane, stopping said oxidation at an attack not greater than 15%, whereby a two-phase liquid oxidation product containing a water phase and an oil phase, and having a substantially reduced ester by-product content is obtained, layer-separating the two phases of said oxidation product, removing the water phase from the oil phase containing said cyclohexanol, thereafter distilling said oil phase to remove cyclohexane therefrom and to recover a residue containing said cyclohexanol, distilling from said residue a distillate comprising said cyclohexanol leaving a second residue containing esters of cyclohexanol, distilling from a portion only of said second residue esters contained therein, and introducing said esters and the remaining portion of said second residue into a mixture of said cyclohexane and water which is then subjected to the aforedescribed treatment with a gas containing oxygen to oxidize said cyclohexane.

FRANK PORTER.
JOHN N. COSBY.

REFERENCES CITED

The following references are of record in the file of this patent:

UNITED STATES PATENTS

| Number | Name | Date |
|---|---|---|
| 2,285,914 | Drossbach | June 9, 1942 |
| 2,336,919 | Batchelder et al. | Dec. 14, 1943 |
| 2,369,181 | Rust et al. | Feb. 13, 1945 |
| 2,410,642 | Farkas et al. | Nov. 5, 1946 |
| 2,439,513 | Hamblet et al. | Apr. 13, 1948 |